(12) United States Patent
Krutmann

(10) Patent No.: US 8,413,798 B2
(45) Date of Patent: Apr. 9, 2013

(54) DEVICE FOR CONVEYING PRODUCTS

(75) Inventor: Roger Krutmann, Arnsberg (DE)

(73) Assignee: Espera-Werke GmbH, Duisberg (DE)

( * ) Notice: Subject to any disclaimer, the term of this patent is extended or adjusted under 35 U.S.C. 154(b) by 0 days.

(21) Appl. No.: 12/736,560

(22) PCT Filed: Feb. 4, 2009

(86) PCT No.: PCT/EP2009/051254
§ 371 (c)(1),
(2), (4) Date: Oct. 18, 2010

(87) PCT Pub. No.: WO2009/130067
PCT Pub. Date: Oct. 29, 2009

(65) Prior Publication Data
US 2011/0036687 A1    Feb. 17, 2011

(30) Foreign Application Priority Data
Apr. 23, 2008  (DE) .................. 10 2008 020 464

(51) Int. Cl.
*B65G 21/20*    (2006.01)
(52) U.S. Cl. ..................................... 198/836.3; 198/817
(58) Field of Classification Search .................. 198/817, 198/836.1, 836.2, 836.3, 842
See application file for complete search history.

(56) References Cited

U.S. PATENT DOCUMENTS

| | | | | |
|---|---|---|---|---|
| 2,670,838 | A * | 3/1954 | Carter | 198/836.3 |
| 2,731,137 | A * | 1/1956 | Socke | 198/690.1 |
| 4,925,012 | A * | 5/1990 | Guntensperger | 198/817 |
| 5,127,789 | A | 7/1992 | McLellan | |
| 5,174,429 | A | 12/1992 | La Vars et al. | |
| 5,684,275 | A | 11/1997 | Tolson | |
| 6,012,568 | A * | 1/2000 | Kane | 198/817 |
| 7,225,917 | B2 * | 6/2007 | Uh et al. | 198/836.3 |
| 7,530,453 | B2 * | 5/2009 | Ingraham | 198/836.3 |
| 7,815,041 | B2 * | 10/2010 | Guenther | 198/836.3 |

FOREIGN PATENT DOCUMENTS

| | | |
|---|---|---|
| DE | 2147939 | 9/1971 |
| DE | 20305351 | 6/2003 |
| EP | 0798240 | 10/1997 |
| WO | WO 02/12095 | 2/2002 |

* cited by examiner

*Primary Examiner* — James R Bidwell
(74) *Attorney, Agent, or Firm* — Ware, Fressola, Maguire & Barber LLP

(57) ABSTRACT

A device for conveying products 2, particularly food products, has a horizontal conveying path supported by a base and having a drive 1 substantially extending in the horizontal direction, wherein the drive 1 is reversibly driven, and is associated with at least one auxiliary conveyor device 3, 4 also supported by the base. The device has a conveying belt 5 for the product 2 driven by a drive, and having rails and carriers 3, 4 to laterally support and carry the product 2 a distance from the drive 1.

30 Claims, 5 Drawing Sheets

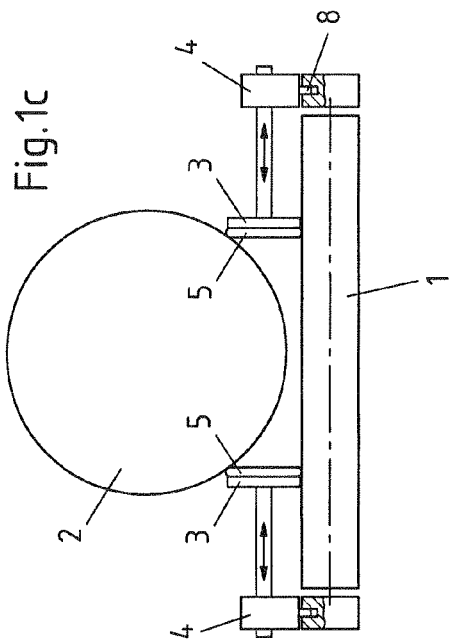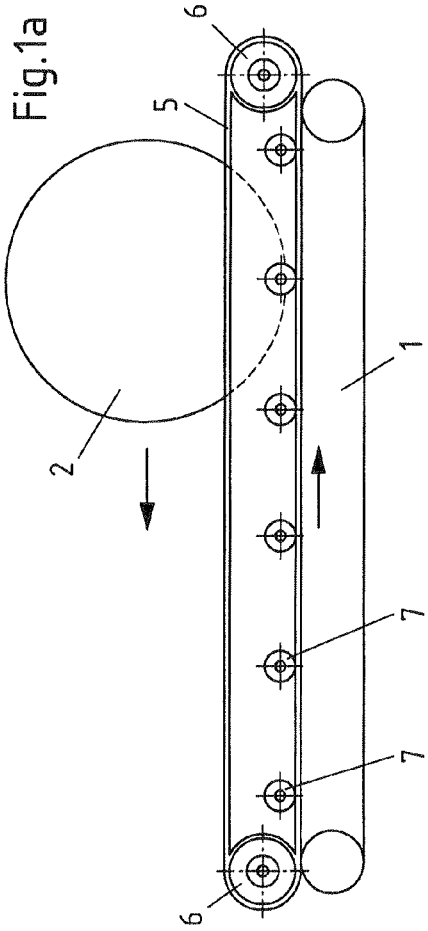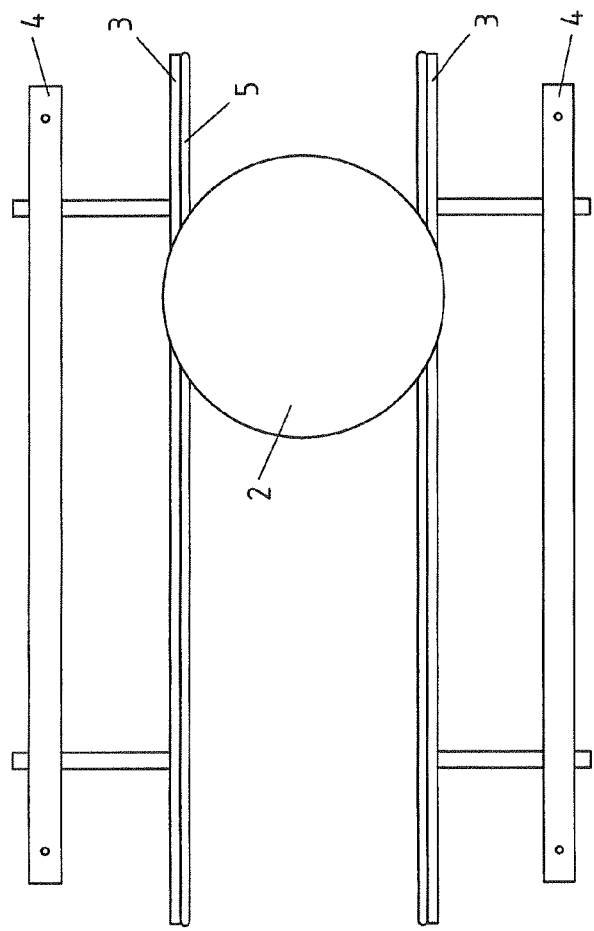

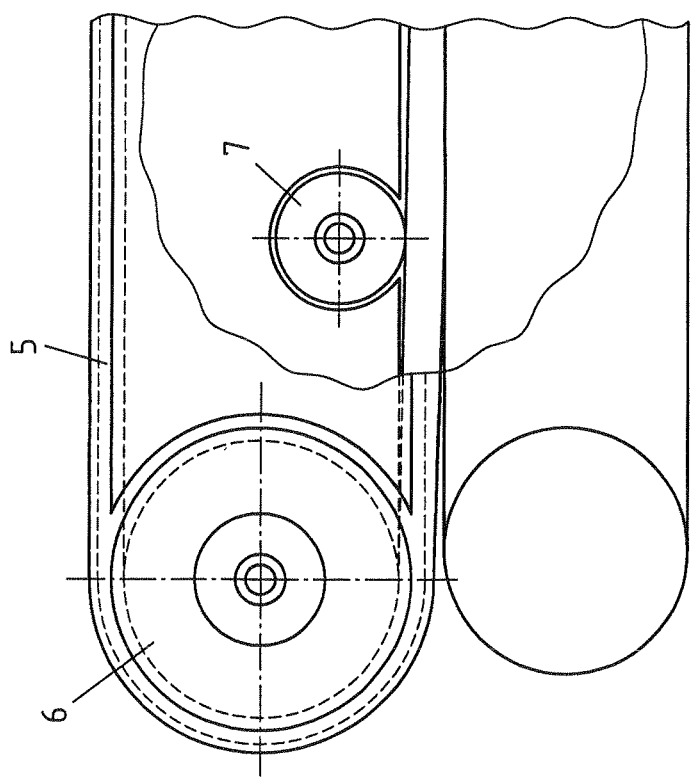
Fig.1e
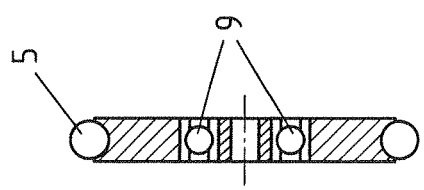
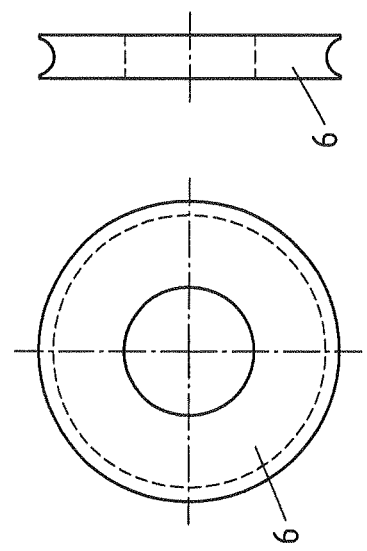
Fig.1d

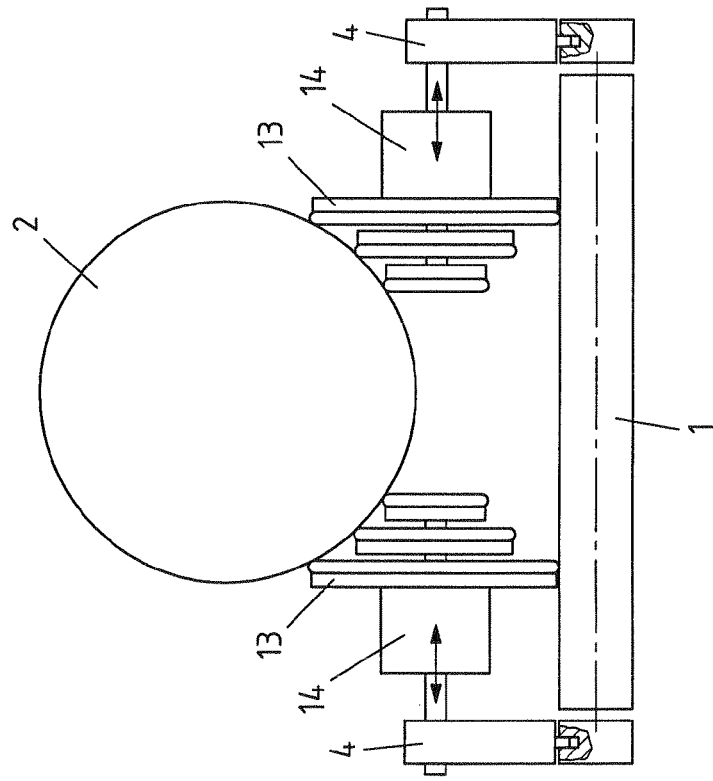
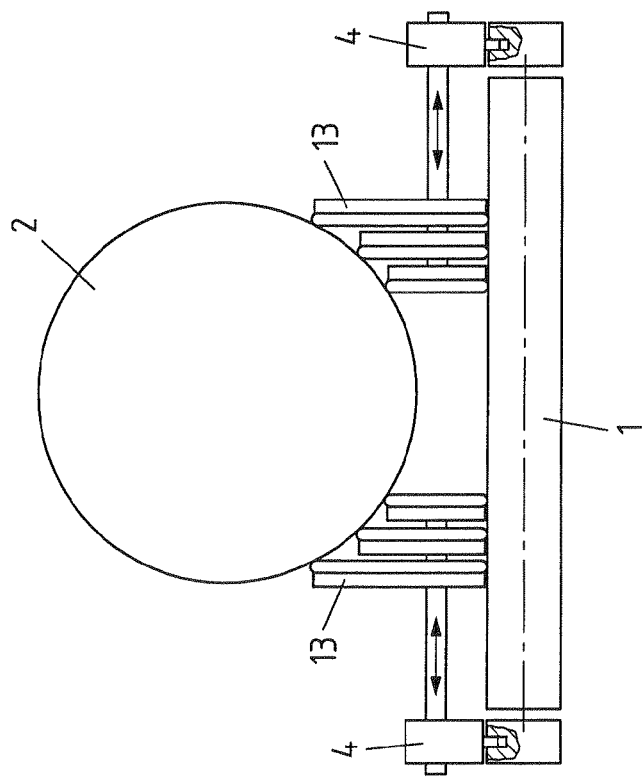

DEVICE FOR CONVEYING PRODUCTS

CROSS REFERENCE TO RELATED APPLICATIONS

This application is the U.S. National Stage of International Application Number PCT/EP2009/051254 filed on Feb. 4, 2009 which was published in English on Oct. 29, 2009 under International Publication Number WO 2009/130067.

TECHNICAL FIELD

The invention relates to a device for conveying products, particularly food products, consisting of a horizontal conveying path supported by a base and having a drive means substantially extending in the horizontal direction.

Such a conveying device is known from practice. It serves for conveying food products which are provided with a price label during the conveyance. For this; the respective product is weighed prior to the labeling process and the result of the weighing is considered when printing the label. Such known conveying devices are suitable for conveying or labeling products which are already placed in a package, wherein the label is printed on the top or bottom side of the packaging. They are also suited for such individual and unpacked products which have a substantially flat bottom face so that they stay on the conveying path during conveying. However, the device known from practice has the disadvantage that such products which are round or have a concave contour can not be retained securely on the conveying path.

From DE 21 47 939, a labeling device is known by means of which individual round bodies such as fruits etc. can be transported. Here, for conveying the products, a roller conveyor is provided, on each roller axis of which two rollers are provided which are tapered towards each other.

SUMMARY OF THE INVENTION

The invention is based on the object to develop a device of the aforementioned type in such a manner that for transporting round or concave products, a variable adaptation of the device to different dimensions of the product is possible in a constructionally simple manner.

The object is solved according to the invention in that the drive means is reversibly driven and is associated with at least one auxiliary conveyor device also supported by the base, said device having a conveying means driven by the drive means for the product and having supporting means by means of which the product is laterally supported and carried at a distance from the drive means.

The invention is characterized in that now the auxiliary conveyor device takes over the conveyance of the product, wherein the conveying means of the auxiliary conveyor device is driven by the drive means. The auxiliary conveyor device is configured in such a manner that it is adapted with respect to its width to the dimensions and the contours of the product, that the product is carried and laterally supported, and that its height dimension is designed such that the product supported by the supporting means does not get in contact with the drive means. In this manner, the product is conveyed directly by the conveying means without the risk of shifting to the side or rolling away.

In one embodiment it is provided that the supporting means of the at least one auxiliary conveyor device are formed by at least two rail elements which are spaced apart from one another perpendicular to the conveying direction and which carry the product between them. This results in a simple design since the rail elements enclose the product between them and the center of gravity can now be positioned such that a stable guidance is possible. By varying the distance of the rail elements to one another, the auxiliary conveyor device can be optimally adapted to the dimension of the product. Varying the distance can be carried out manually or automatically, for example by using a detection device detecting the product dimensions, e.g. a camera. Preferably, a rail element is supported by a carrier element which can be fastened onto the base. This results also, among other things, in a module-like structure for the auxiliary conveyor device.

A preferred embodiment of the invention provides that the rail element has a driving means, in particular a belt drive, which extends along the circumference of the rail element and which, on the bottom side of the rail element, is in frictional contact with the drive means and, on the top side of the rail element, is in frictional contact with the product. The frictional contact between the belt drive on the bottom side of the rail element and the drive means of the conveying path results in an optimal force transmission. Here, in order that a conveyance in the initial conveying direction can take place, the drive direction of the reversible drive means must be reversed.

Preferably, it is provided that the belt drive is guided by deflection rollers, that the deflection rollers comprise ball bearings, and that along the bottom side of the rail element, bearing rollers are provided which are spaced apart from one another. By means of the bearing rollers provided on the bottom side of the rail element it is achieved that a force transmission in a frictionally connected manner from the drive means to the driving means takes place only in the area of the bearing rollers, and that on all other positions, a friction as low as possible is generated. Here, the bearing rollers are provided with an anti-friction bearing, e.g. a roller bearing, or are supported by sliding materials or air cushions. The friction of the driving means in the rail element can be reduced by special sliding materials or air cushions.

Preferred embodiments for the belt drive forming the driving means are a round belt, a chain, a toothed belt, a flat belt, or a ribbed v-belt.

Due to the fact that according to a further embodiment, the auxiliary conveyor device can be placed onto a guide of the drive means, the advantage arises that a flexible adaptation to the respective conveying conditions is made possible. The auxiliary conveyor device does not have to be fixedly connected to the conventional conveyor device but can be inserted in a simple manner from above, for example by means of a pin connection. This results also in an easy interchangeability so that for a product change, an auxiliary conveyor device can be selected which is dimensioned for the new product. Another preferred embodiment provides that groups of rail elements are provided, wherein the rail elements are each offset to one another perpendicular to the conveying direction and the respective heights of the same are adapted to the surface structure of the product, wherein on the respective contact points with the product, the angular velocities of the respective belt drives are equal. Each of the rail elements which are offset perpendicularly to one another can be driven separately or only at least one of the rail elements offset perpendicularly to one another of a group, wherein the remaining ones are connected via a gear unit to the driven rail element.

Each of the embodiments results in a particularly secure support of the product since the same is supported at several places. This is in particular advantageous for comparatively heavy products, e.g. pumpkins or melons.

The preferred embodiment for the drive means is a revolving belt.

Advantageously, the horizontal conveying path consists of individual, at least two path sections, wherein each path section has its own function, e.g. an entry path for the product, a weighing path for the product, a labeling station, or an exit path for the product. Each path section is associated with one auxiliary conveyor device so that based on the device known from practice, a retrofitting in the meaning of the invention can take place in a simple manner so that with such a refitting, the transition to products which previously could not be handled can take place in a simple manner.

A further special embodiment of the invention arises for the area where two adjacent auxiliary devices run parallel to one another. Here, it is provided that the adjacent rail elements overlap one another and that the distances of the respective rail elements to one another are adapted in such a manner that in each case two rail elements abut closely side-by-side but do not touch one another. To minimize, at the same time, a change of the product's center of gravity during the transfer between two auxiliary conveyor devices, a deflection device or height adjustment is provided on the top side of a rail element. The height adjustment serves for variably guiding the driving means specifically with respect to its height so that the unavoidable gaps between the rail elements are compensated. The guide of the driving means with respect to the its height is adapted in each case to the geometry of the product, wherein this can be carried out manually but also automatically using an optical detection means, in particular a camera, detecting the product geometry at the transition point. Preferably, an eccentric is provided as actuator for the deflection device.

BRIEF DESCRIPTION OF THE DRAWINGS

The invention is illustrated hereinafter in more detail by means of a drawing. In the figures:

FIG. 1a shows a first exemplary embodiment of the invention in a front view;

FIG. 1b shows FIG. 1a in a top view;

FIG. 1c shows FIG. 1a in a side view;

FIG. 1d shows a detail to FIG. 1a in the area of the deflection roller, and

FIG. 1e shows an illustrative sketch in connection with FIG. 2a;

FIG. 2 shows a second exemplary embodiment of the invention;

FIG. 3 shows a third exemplary embodiment of the invention;

DETAILED DESCRIPTION

Figure 4A:
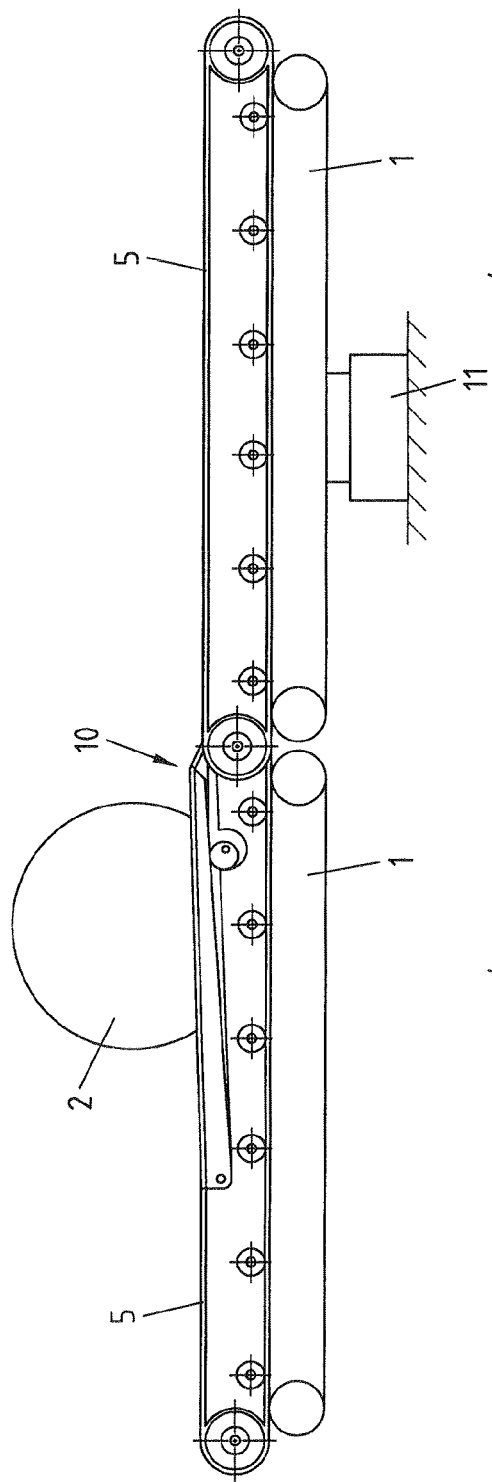
FIG. 4a shows a fourth exemplary embodiment of the invention in a side view.
Figure 4B:
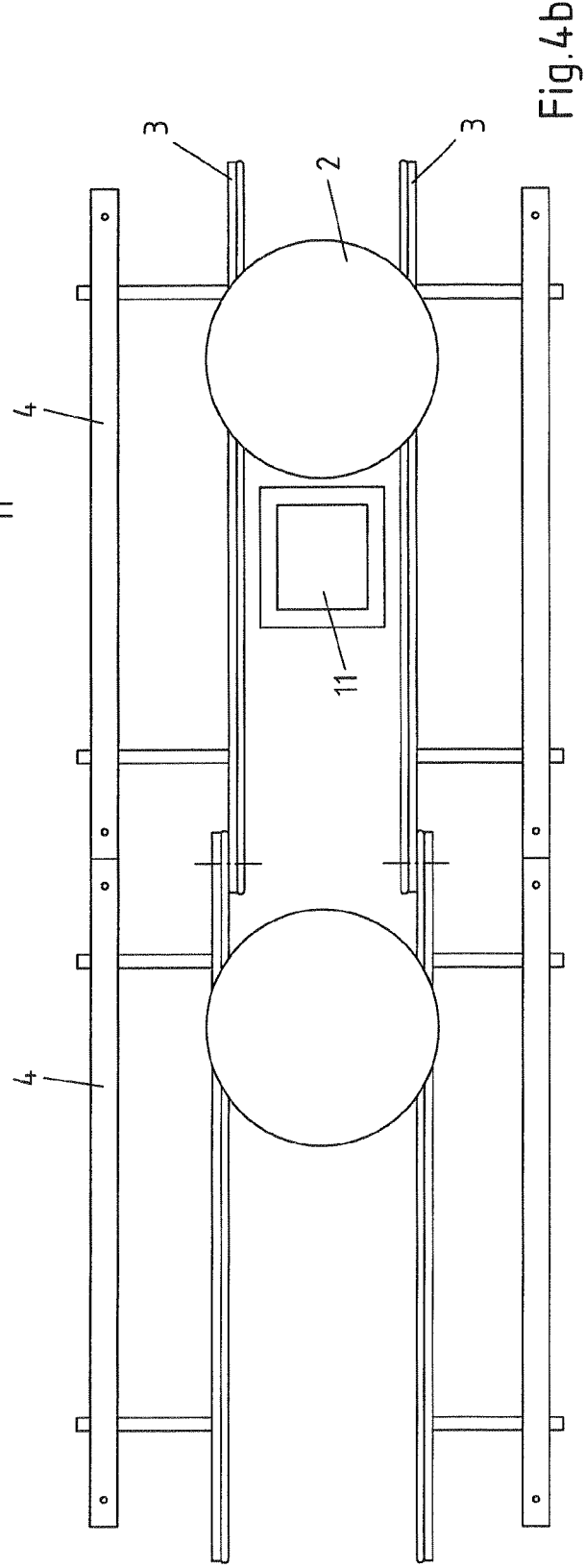
FIG. 4b shows the exemplary embodiment according to FIG. 4a in a top view.
Figure 4D:
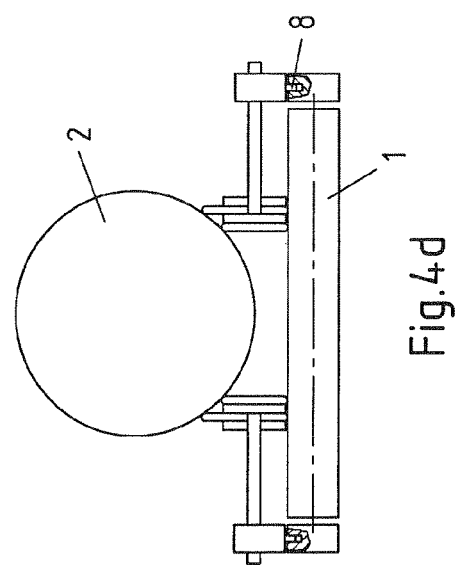
FIG. 4d shows the exemplary embodiment according to FIG. 4a in a front view.

The first exemplary embodiment illustrated in the FIGS. 1a to 1e shows a device for conveying products 2. Said device includes a non-illustrated stationary base at which a horizontal conveying path is constructed which is formed by a belt 1 as drive means and which extends substantially in the horizontal direction. The transport belt 1 is guided by deflection rollers and is driven, for example, in the direction of the arrow. Above the belt 1 is an auxiliary conveyor device which (e.g. in FIG. 1b) is formed by two rail elements 3 which extend in conveying direction and which each are supported by carrier elements 4 and are also fastened in a suitable manner on the (non-illustrated) stationary base. The distance perpendicular to the conveying direction between the rail elements 3 can be increased and also decreased, as indicated by the arrow directions in FIG. 1b, depending on the size of the products 2 to be conveyed. Along its circumference, each rail element 3 carries a driving means in the form of a belt drive 5. The same is configured as a round belt. At the bottom side of the rail element 3, the round belt 5 is in frictional connection with belt 1 so that the movement direction of the belt 1 determines also the movement direction of the round belt on the bottom side of the rail element 3. On the top side of the rail element 3, the round belt is in frictional connection with the product 2 so that the same is carried along by the movement of the round belt 5. On the bottom side of the rail element 3 are bearing rollers 7 which define the points at which the frictional connection to belt 1 takes place. The round belt 5 is guided at the rail element by deflection rollers 6, which is in particular apparent from FIG. 1a.

Through a pin arranged in the carrier elements, the attachment forming the auxiliary conveyor device is detachably mounted in a bore hole formed in the guiding device for the belt 1 (FIG. 1c). This allows a simple insertion and a simple exchange of the respective auxiliary conveyor devices.

As is in particular apparent from FIG. 1c, the height of the rail elements 3 is dimensioned such that it is adapted to the geometry of the product 2 in such a manner that the area at the bottom side of the product 2 extending between the rail elements 3 does not get in contact with the belt 1 which would prevent the product 2 from being conveyed.

The detail of the embodiment according to FIG. 1a illustrated in FIG. 1d shows a deflection roller 6 in which the round belt 5 is guided. The deflection roller 6 is supported by means of a ball bearing 9, in particular a roller bearing, in the rail element 3.

As FIG. 1e shows, each of the bearing rollers 7 is supported in a low-friction manner, for example with an air cushion or sliding materials so that the friction between the rail element 3 and the round belt 5 can be kept as low as possible.

FIG. 2 shows a second exemplary embodiment of the invention. Here, instead of one single rail element on each side of the product 2, a set (a group) of three rail elements 13 is provided, the dimensions of which are adapted to the geometry of the product 2 in such a manner that at the contact points between the rail elements 13 and the surface of the product 2 in each case the same angular velocity is generated. Each of the rail elements is configured such that it is individually driven by belt 1.

The third exemplary embodiment of the invention illustrated in FIG. 3 differs from the one that is the subject matter of the second exemplary embodiment in that the set of rail elements 13 is designed such that only one of the rail elements is driven via frictional connection and the other rail elements are put via suitable gear ratios of a gear 14 in such a speed that the circumferential speeds at the position of the product are again equal.

The embodiments according to FIGS. 2 and 3 are suitable in particular for heavy and large products as well as for products with a surface greatly deviating from the round shape.

Finally, the FIGS. 4a to 4d show the fourth exemplary embodiment of the invention. It differs from the previously illustrated exemplary embodiments in that along the conveying path now two path sections are formed, wherein the left path section is an entry path for the product 2 and the right path section includes a scale 11. To each of the conveying path sections, a separate auxiliary conveyor device is assigned. At the joint between two adjacent auxiliary conveyor devices it is necessary that the same are shaped in such a manner that they form an overlapping area so that a continuous transport of the product can take place.

Figure 4C:
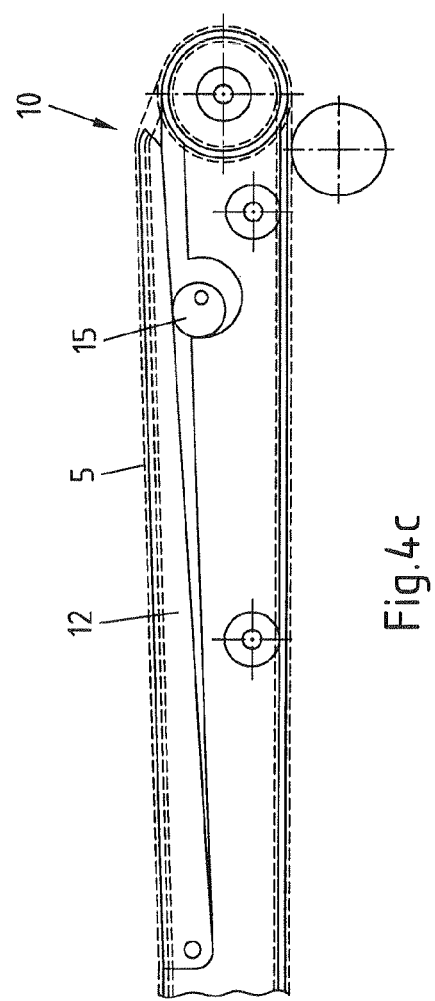
FIG. 4c shows the exemplary embodiment according to FIG. 4a in a detail.

However, at the overlapping points between the auxiliary conveyor devices, due to the gap of adjacent rail elements 3, an unsteady course of the movement of the product 2 is to be expected. To compensate the same, the deflection device 12 illustrated in FIG. 4c is provided.

The deflection device includes a lever 12 which is mounted on one side and which is actuated by an eccentric 15. The lever 12 engages with the bottom side of the belt 5 and raises path of the same compared the substantially flat path illustrated in the other exemplary embodiments. Hereby, the distance gap between the rail elements at the transition from one auxiliary conveyor device to the other is compensated. Instead of using an eccentric with spring or damper, the setting of the deflection device can also be carried out via other actuating means, for example automatically using an adequate detector for the dimension of the product in the area of the transition point.

The present invention has in particular the advantage that the product to be conveyed is transported with its center of gravity lying as low as possible. For this, a suitable adaptation of the distance between the rail elements is to be carried out; this can also be carried out automatically using an adequate detector for the dimension of the product. Due to the frictional connection between the drive means (belt 1) and the driving means of the auxiliary conveyor device, an existing conveying device as it is known from the prior art can be retrofitted in a simple manner. Also, an easy module-like exchange can be achieved because in each case, the auxiliary conveyor devices simply have to be inserted from above into the existing device.

The invention claimed is:

1. A device for conveying products, in particular food products, comprising:
 a horizontal conveying path supported by a base and having a drive means substantially extending in the horizontal direction, wherein the drive means is reversibly driven and is associated with at least one auxiliary conveyor device also supported by the base,
 a conveying means for the product driven by the drive means, and
 supporting means by means of which the product is laterally supported and carried at a distance from the drive means, wherein the supporting means of the at least one auxiliary conveyor device are formed by at least two rail elements which are spaced apart from one another perpendicular to the conveying direction and which carry the product between them, and actuating means for varying the distance of the rail elements to one another are provided depending on the size of the products to be conveyed, wherein the rail element has a driving means, in particular a belt drive, which extends along the circumference of the rail element and which, on the bottom side of the rail element, is in frictional connection with the drive means and, on the top side of the rail element, is in frictional connection with the product.

2. The device according to claim 1, characterized in that a rail element is supported by at least one carrier element which can be fastened to the stationary base.

3. The device according to claim 1, characterized in that the belt drive is guided by deflection rollers associated to the rail element.

4. The device according to claim 3, characterized in that the deflection rollers comprise ball bearings.

5. The device according to claim 1, characterized in that along the bottom side of the rail element, bearing rollers are provided which are spaced apart from one another.

6. The device according to claim 5, characterized in that the bearing rollers comprise a ball bearing, in particular a roller bearing.

7. The device according to claim 5, characterized in that the bearing rollers are supported in sliding materials.

8. The device according to claim 5, characterized in that the bearing rollers are supported in an air cushion.

9. The device according to claim 1, characterized in that the belt drive is a round belt.

10. The device according to claim 1, characterized in that the belt drive is a chain.

11. The device according to claim 1, characterized in that the belt drive is a toothed belt.

12. The device according to claim 1, characterized in that the belt drive is a ribbed v-belt.

13. The device according to claim 1, characterized in that the belt drive is a flat belt.

14. The device according to claim 1, characterized in that the at least one auxiliary conveyor device can be placed onto a guide of the drive means.

15. The device according to claim 14, characterized in that the connection of the auxiliary conveyor device to the guide of the drive means is carried by means of guide pins of the carrier elements which guide pins engage with a bore hole in the guide.

16. The device according to claim 1, characterized in that groups of rail elements are provided, wherein the rail elements are each offset to one another perpendicular to the conveying direction and the respective heights of the same are adapted to the surface structure of the product.

17. The device according to claim 16, characterized in that each of the rail elements, which are offset perpendicularly to one another, is driven separately.

18. The device according to claim 16, characterized in that only at least one of the rail elements of a group is driven, which rail elements are offset perpendicularly to one another, and the other ones are connected thereto via a gear.

19. The device according to claim 1, characterized in that the drive means is a belt.

20. The device according to claim 1, characterized in that the horizontal conveying path consists of at least two path sections.

21. The device according to claim 19, characterized in that the horizontal conveying path has a path section for infeeding the product.

22. The device according to claim 19, characterized in that the horizontal conveying path has a path section for outfeeding the product.

23. The device according to claim 19, characterized in that along a path section of the conveying path at least one labeling station is configured for attaching a product label on the product surface.

24. The device according to claim 19, characterized in that along a further path section of the conveying path at least one weighing device is configured for determining the product weight.

25. The device according to claim 19, characterized in that to each path section, one auxiliary conveyor device is assigned.

26. The device according to claim 25, characterized in that two adjacent auxiliary conveyor devices are connected to one another in such an overlapping manner that the respective rail elements are adjacent to one another without having contact.

27. The device according to claim 1, characterized in that a deflection device, in particular a height adjustment device is provided by means of which the driving means is guided on the top side of the rail element and is variable with respect to its height.

28. The device according to claim 27, characterized in that the height of the driving means can be adapted to the geometry of the product in such a manner that during the transition between two adjacent auxiliary conveyor devices, an abrupt change of the product's center of gravity is prevented.

29. The device according to claim 28, characterized in that the height adaptation is carried out automatically using an optical detection means, in particular a camera, detecting the product geometry.

30. The device according to claim 27, characterized in that as actuator for the deflection device, an eccentric is provided which is configured in particular in a resilient or damped manner.

* * * * *